US011196954B2

(12) United States Patent
Duan et al.

(10) Patent No.: US 11,196,954 B2
(45) Date of Patent: Dec. 7, 2021

(54) PIXEL CIRCUIT FOR CONVERTING AN OPTICAL SIGNAL INTO AN ELECTRIC SIGNAL COMPRISING A STORAGE CIRCUIT STORING CHARGE OUTPUT FROM AN AMPLIFYING CIRCUIT, AND DRIVE METHOD THEREOF, AND DETECTOR USING THE SAME

(71) Applicant: BOE TECHNOLOGY GROUP CO., LTD., Beijing (CN)

(72) Inventors: Liye Duan, Beijing (CN); Yongming Shi, Beijing (CN); Chunqian Zhang, Beijing (CN); Kui Liang, Beijing (CN); Xiaohui Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 164 days.

(21) Appl. No.: 16/176,011

(22) Filed: Oct. 31, 2018

(65) Prior Publication Data

US 2019/0238778 A1 Aug. 1, 2019
US 2020/0260040 A9 Aug. 13, 2020

(30) Foreign Application Priority Data

Jan. 29, 2018 (CN) .......................... 201810083880.1

(51) Int. Cl.
*H04N 5/3745* (2011.01)
*H04N 5/32* (2006.01)
*H04N 5/365* (2011.01)

(52) U.S. Cl.
CPC ............. *H04N 5/3745* (2013.01); *H04N 5/32* (2013.01); *H04N 5/3651* (2013.01)

(58) Field of Classification Search
CPC ...... H04N 5/3745; H04N 5/3651; H04N 5/32; H04N 5/369; H04N 5/3698; H01L 27/14609; H01L 27/14612
See application file for complete search history.

(56) References Cited

U.S. PATENT DOCUMENTS 6,054,704 A * 4/2000 Pritchard ............... H04N 3/155
250/208.1
6,831,691 B1 * 12/2004 Takada ............... H04N 5/35518
348/308

(Continued)

FOREIGN PATENT DOCUMENTS

CN 101841635 A 9/2010
CN 103218972 A 7/2013

(Continued)

OTHER PUBLICATIONS

China First Office Action, Application No. 201810083880.1, dated Nov. 19, 2019, 19 pps.: with English translation.

(Continued)

*Primary Examiner* — Jennifer D Bennett
(74) *Attorney, Agent, or Firm* — Armstrong Teasdale LLP

(57) ABSTRACT

Embodiments of the present disclosure provide a pixel circuit and a drive method thereof, and a detector including the pixel circuit. The pixel circuit includes a photoelectric conversion circuit, a reset circuit, an amplifying circuit, a first control circuit, a second control circuit, a storage circuit, and an output circuit. The photoelectric conversion circuit is configured to convert an optical signal into an electric signal. The reset circuit is configured to reset a voltage of the first node. The amplifying circuit is configured to amplify the voltage of the first node. The first control circuit is configured to control a voltage of the second node. The second control circuit is configured to control a voltage of the third node. The storage circuit is configured to store an electric (Continued)

charge corresponding to the voltage outputted from the amplifying circuit. The output circuit is configured to output the stored electric charge.

11 Claims, 4 Drawing Sheets

(56) References Cited

U.S. PATENT DOCUMENTS

| | | | |
|---|---|---|---|
| 9,681,074 B2 * | 6/2017 | Duan | ............... G01T 1/247 |
| 2007/0187609 A1 | 8/2007 | Karim | |

FOREIGN PATENT DOCUMENTS

| | | | |
|---|---|---|---|
| CN | 103310728 A | 9/2013 | |
| CN | 203325408 U | 12/2013 | |
| CN | 203940782 U | 11/2014 | |
| CN | 104867431 A | 8/2015 | |
| CN | 106464820 A | 2/2017 | |
| CN | 107393479 A | 11/2017 | |
| WO | WO-2016197508 A1 * | 12/2016 | ......... H04N 5/357 |

OTHER PUBLICATIONS

China Second Office Action, Application No. 201810083880.1, dated Jun. 16, 2020, 20 pps.: with English translation.

* cited by examiner

PIXEL CIRCUIT FOR CONVERTING AN OPTICAL SIGNAL INTO AN ELECTRIC SIGNAL COMPRISING A STORAGE CIRCUIT STORING CHARGE OUTPUT FROM AN AMPLIFYING CIRCUIT, AND DRIVE METHOD THEREOF, AND DETECTOR USING THE SAME

CROSS REFERENCE TO RELATED APPLICATIONS

This patent application claims the benefit and priority of Chinese Patent Application No. 201810083880.1 filed on Jan. 29, 2018, the disclosure of which is incorporated by reference herein in its entirety as part of the present application.

BACKGROUND

The present disclosure relates to the field of display technologies, and more particularly, to a pixel circuit and a drive method thereof, and a detector.

As a core component used for implementing computerized tomography (CT) imaging, an X-ray flat panel detector can convert an X-ray invisible to a naked eye into a digitized signal that can be finally converted into an image. The X-ray flat panel detector takes a photodiode array as its core. Under X-ray irradiation, a scintillator or phosphor layer of the detector converts X-ray photons into visible light, and then the visible light is converted by the photodiode array into an analog signal of the image. The analog signal is read by a peripheral circuit, and the analog signal is converted into the digitized signal by way of analog-to-digital conversion. The X-ray flat panel detector has a quick imaging speed, has a good space and density resolution, and provides a direct digital output, etc.

BRIEF DESCRIPTION

Embodiments of the present disclosure provide a pixel circuit and a drive method thereof, and a detector.

A first aspect of the present disclosure provides a pixel circuit. The pixel circuit includes a photoelectric conversion circuit, a reset circuit, an amplifying circuit, a first control circuit, a second control circuit, a storage circuit, and an output circuit. The photoelectric conversion circuit is coupled to a first node and a first voltage terminal and is configured to convert an optical signal into an electric signal. The reset circuit is coupled to a reset terminal, the first node and the first voltage terminal and is configured to reset a voltage of the first node based on a reset signal from the reset terminal and a first voltage signal from the first voltage terminal. The amplifying circuit is coupled to the first node, a second node, and a third node and is configured to amplify the voltage of the first node. The first control circuit is coupled to a first control terminal, a second voltage terminal, and the second node and is configured to control a voltage of the second node based on a first control signal from the first control terminal and a second voltage signal from the second voltage terminal. The second control circuit is coupled to the first node, the third node, and a second control terminal and is configured to control a voltage of the third node based on a second control signal from the second control terminal and the voltage of the first node. The storage circuit is coupled to the first voltage terminal and the third node and is configured to store an electric charge corresponding to the voltage outputted from the amplifying circuit. The output circuit is coupled to the third node, a third control terminal, and an output terminal and is configured to output the electric charge stored in the storage circuit under the control of a third control signal of the third control terminal.

In some embodiments of the present disclosure, the storage circuit includes a capacitor. A first terminal of the capacitor is coupled to the first voltage terminal, and a second terminal of the capacitor is coupled to the third node.

In some embodiments of the present disclosure, the photoelectric conversion circuit includes a photodiode. An anode of the photodiode is coupled to a first voltage terminal, and a cathode of the photodiode is coupled to a first node.

In some embodiments of the present disclosure, the reset circuit includes a first transistor. A control electrode of the first transistor is coupled to a reset terminal, a first electrode of the first transistor is coupled to the first voltage terminal, and a second electrode of the first transistor is coupled to the first node.

In some embodiments of the present disclosure, the amplifying circuit includes an amplifying transistor. A control electrode of the amplifying transistor is coupled to the first node, a first electrode of the amplifying transistor is coupled to the second node, and a second electrode of the amplifying transistor is coupled to the third node.

In some embodiments of the present disclosure, the first control circuit includes a second transistor. A control electrode of the second transistor is coupled to a first control terminal, a first electrode of the second transistor is coupled to a second voltage terminal, and a second electrode of the second transistor is coupled to the second node.

In some embodiments of the present disclosure, the second control circuit includes a third transistor. A control electrode of the third transistor is coupled to a second control terminal, a first electrode of the third transistor is coupled to the first node, and a second electrode of the third transistor is coupled to the third node.

In some embodiments of the present disclosure, the output circuit includes a fourth transistor. A control electrode of the fourth transistor is coupled to a third control terminal, a first electrode of the fourth transistor is coupled to the third node, and a second electrode of the fourth transistor is coupled to an output terminal.

A second aspect of the present disclosure provides a pixel circuit. The pixel circuit includes a photodiode, a first transistor, an amplifying transistor, a second transistor, a third transistor, a capacitor, and a fourth transistor. An anode of the photodiode is coupled to a first voltage terminal, and a cathode of the photodiode is coupled to a first node. A control electrode of the first transistor is coupled to a reset terminal, a first electrode of the first transistor is coupled to the first voltage terminal, and a second electrode of the first transistor is coupled to the first node. A control electrode of the amplifying transistor is coupled to the first node, a first electrode of the amplifying transistor is coupled to the second node, and a second electrode of the amplifying transistor is coupled to the third node. A control electrode of the second transistor is coupled to a first control terminal, a first electrode of the second transistor is coupled to a second voltage terminal, and a second electrode of the second transistor is coupled to the second node. A control electrode of the third transistor is coupled to a second control terminal, a first electrode of the third transistor is coupled to the first node, and a second electrode of the third transistor is coupled to the third node. A first terminal of the capacitor is coupled to the first voltage terminal, and a second terminal of the capacitor is coupled to the third node. A control electrode of the fourth transistor is coupled to a third control terminal, a first electrode of the fourth transistor is coupled to the third node, and a second electrode of the fourth transistor is coupled to an output terminal.

In some embodiments of the present disclosure, all the transistors are either P-type transistors or N-type transistors.

A third aspect of the present disclosure provides a detector. The detector includes the aforementioned pixel circuit according to the first aspect and the second aspect of the present disclosure.

A fourth aspect of the present disclosure provides a drive method for driving the aforementioned pixel circuit according to the first aspect and the second aspect of the present disclosure. In this drive method, a reset signal is provided to the reset terminal so as to reset a voltage of the first node. Next, a first control signal is provided to the first control terminal and a second control signal is provided to the second control terminal so as to apply to the first node a compensation voltage used for compensating the amplifying circuit. Next the first control signal is provided to the first control terminal and the second control signal is provided to the second control terminal, so as to provide an electric signal converted from an optical signal to the first node and to obtain, at the third node, the amplified voltage of the first node. The storage circuit stores the electric charge corresponding to the voltage of the third node. Next, the third control signal is provided to the third control terminal, so as to output the electric charge stored in the storage circuit.

BRIEF DESCRIPTION OF THE DRAWINGS

To describe technical solutions of the embodiments of the present disclosure more clearly, the accompanying drawings of the embodiments will be briefly introduced in the following. It should be known that the accompanying drawings in the following description merely involve with some embodiments of the present disclosure, but not limit the present disclosure, in which.

DETAILED DESCRIPTION

Figure 1:
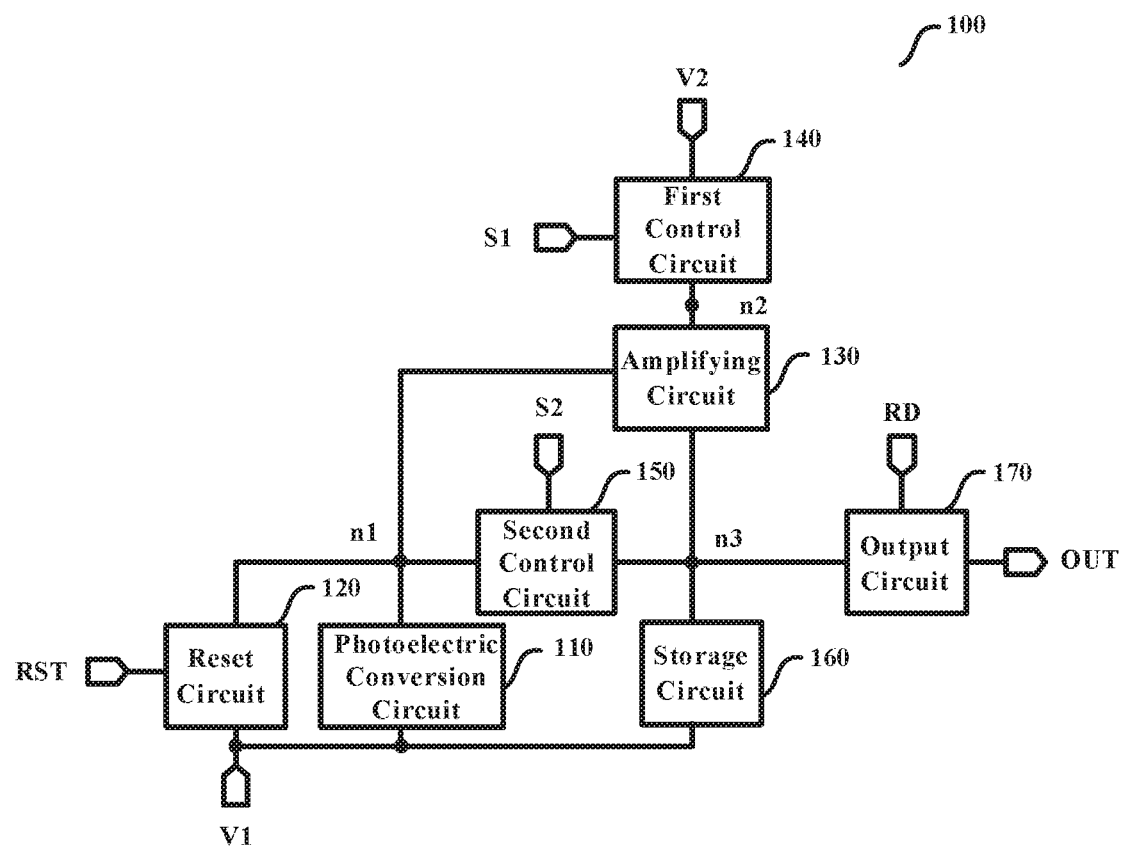
FIG. 1 is a schematic block diagram of a pixel circuit according to an embodiment of the present disclosure.

To make the technical solutions and advantages of the embodiments of the present disclosure clearer, the technical solutions in the embodiments of the present disclosure will be described clearly and completely below, in conjunction with the accompanying drawings in the embodiments of the present disclosure. Obviously, the described embodiments are merely some but not all of the embodiments of the present disclosure. All other embodiments obtained by those skilled in the art based on the described embodiments of the present disclosure without creative efforts shall fall within the protecting scope of the present disclosure.

Unless otherwise defined, all terms (including technical and scientific terms) used herein have the same meaning as commonly understood by those skilled in the art to which present disclosure belongs. It will be further understood that terms, such as those defined in commonly used dictionaries, should be interpreted as having a meaning that is consistent with their meaning in the context of the specification and will not be interpreted in an idealized or overly formal sense unless expressly so defined herein. As used herein, the description of "connecting" or "coupling" two or more parts together should refer to the parts being directly combined together or being combined via one or more intermediate components.

In all the embodiments of the present disclosure, a source and a drain (an emitter and a collector) of a transistor are symmetrical, and a current from the source to the drain (from the emitter to the collector) to turn on an N-type transistor is in an opposite direction with respect to the current from the source to the drain (from the emitter and the collector) to turn on an a P-type transistor. Therefore, in the embodiments of the present disclosure, a controlled intermediate terminal of the transistor is referred to as a control electrode, a signal input terminal is referred to as a first electrode, and a signal output terminal is referred to as a second electrode. The transistors used in the embodiments of the present disclosure mainly are switching transistors. In addition, terms such as "first" and "second" are only used to distinguish one element (or a part of the element) from another element (or another part of this element).

Different from an image sensor technology on a complementary metal oxide semiconductor (CMOS) based on a silicon process, in a pixel circuit based on a thin-film transistor (TFT) process, a consistency problem of critical TFT in each pixel is relatively severe because of being subject to technological level and a larger size of itself. Therefore, in an existing X-ray flat panel detector, a TFT in a pixel is merely used as a switch. Electric charges accumulated in a photodiode of the X-ray flat panel detector generally are small, and thus are susceptible to noise. An electric signal obtained by the photodiode is read out, and then is amplified by a bus terminal amplifier. Thus, noise of the readout electric signal is large, and its signal-to-noise ratio S/N is low. In addition, the quality of an entire image may be affected because noise amplitudes of pixels at different locations are different. An amplifying transistor may be introduced into a pixel of the X-ray flat panel detector to amplify the detected electric signal before reading out the electric signal, so as suppress noise levels. However, a threshold voltage Vth of the amplifying transistor may be changed. A more severe problem of image quality may be caused if the threshold voltage Vth of the amplifying transistor is not compensated.

An embodiment of the present disclosure provides a pixel circuit which can compensate the threshold voltage Vth of the amplifying transistor. FIG. 1 illustrates a schematic block diagram of the pixel circuit 100 according to an embodiment of the present disclosure. As shown in FIG. 1, the pixel circuit 100 may include a photoelectric conversion circuit 110, a reset circuit 120, an amplifying circuit 130, a first control circuit 140, a second control circuit 150, a storage circuit 160, and an output circuit 170.

The photoelectric conversion circuit 110 is coupled to a first node n1 and a first voltage terminal V1 and is configured to convert an optical signal into an electric signal.

The reset circuit 120 is coupled to a reset terminal RST, the first node n1 and the first voltage terminal V1 and is configured to reset a voltage of the first node n1 based on a reset signal from the reset terminal RST and a first voltage signal from the first voltage terminal V1.

The amplifying circuit 130 is coupled to the first node n1, a second node n2, and a third node n3 and is configured to amplify the voltage of the first node n1.

The first control circuit 140 is coupled to a first control terminal S1, a second voltage terminal V2, and the second node n2 and is configured to control a voltage of the second node n2 based on a first control signal from the first control terminal S1 and a second voltage signal from the second voltage terminal V2.

The second control circuit 150 is coupled to the first node n1, the third node n3, and a second control terminal S2 and is configured to control a voltage of the third node n3 based on a second control signal from the second control terminal S2 and the voltage of the first node n1.

The storage circuit 160 is coupled to the first voltage terminal V1 and the third node n3 and is configured to store an electric charge corresponding to the voltage outputted from the amplifying circuit 130.

The output circuit 170 is coupled to the third node n3, a third control terminal RD, and an output terminal OUT and is configured to output the electric charge stored in the storage circuit 160 under the control of a third control signal of the third control terminal RD.

The pixel circuit according to some embodiments of the present disclosure can compensate the threshold voltage Vth of the amplifying transistor. Furthermore, different from a technical solution in which an electric signal converted by the photoelectric conversion circuit 110 is obtained by outputting an electric current and then integrating the electric current by an external chip, in some embodiments of the present disclosure, an electric charge corresponding to the voltage outputted from the amplifying circuit 130 is stored by the storage circuit 160, and then the electric charge stored in the storage circuit 160 is read out, such that an integration of the electric current is already completed inside a pixel. Moreover, time spent in reading out the electric charge is shorter than time spent in reading out the electric current. Therefore, the pixel circuit according to some embodiments of the present disclosure can read out an analog signal more accurately, and more quickly, and reduce costs of the external chip.

Figure 2:
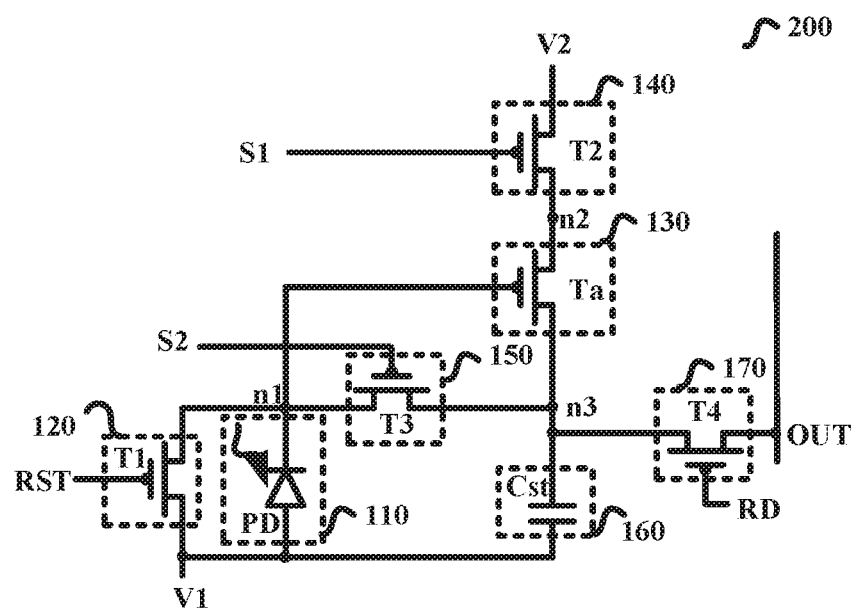
FIG. 2 is an exemplary circuit diagram of a pixel circuit according to an embodiment of the present disclosure.

FIG. 2 illustrates an exemplary circuit diagram of a pixel circuit 200 according to an embodiment of the present disclosure. In the embodiment as shown in FIG. 2, reference is made by taking an example in which all the transistors are P-type transistors. In this case, a low level signal VSS is outputted from the first voltage terminal V1, and a high level signal VDD is outputted from the second voltage terminal V2. The high level signal and the low level signal refer to a higher preset voltage signal and a lower preset voltage signal with respect to each other. Those skilled in the art may set the high level signal and the low level signal based on the selected device and the adopted circuit structure, but the present disclosure is not limited thereto.

As shown in FIG. 2, the storage circuit 160 may include a capacitor Cst. A first terminal of the capacitor Cst is coupled to the first voltage terminal V1, and a second terminal of the capacitor Cst is coupled to the third node n3.

The photoelectric conversion circuit 110 may include a photodiode PD. An anode of the photodiode PD is coupled to a first voltage terminal V1, and a cathode of the photodiode PD is coupled to a first node n1.

The reset circuit 120 may include a first transistor T1. A control electrode of the first transistor T1 is coupled to a reset terminal RST, a first electrode of the first transistor T1 is coupled to the first voltage terminal V1, and a second electrode of the first transistor T1 is coupled to the first node n1.

The amplifying transistor 130 may include an amplifying transistor Ta. A control electrode of the amplifying transistor Ta is coupled to the first node n1, a first electrode of the amplifying transistor Ta is coupled to the second node n2, and a second electrode of the amplifying transistor Ta is coupled to the third node n3.

The first control circuit 140 may include a second transistor T2. A control electrode of the second transistor T2 is coupled to a first control terminal S1, a first electrode of the second transistor T2 is coupled to a second voltage terminal V2, and a second electrode of the second transistor T2 is coupled to the second node n2.

The second control circuit 150 may include a third transistor T3. A control electrode of the third transistor T3 is coupled to a second control terminal S2, a first electrode of the third transistor T3 is coupled to the first node n1, and a second electrode of the third transistor T3 is coupled to the third node n3.

The output circuit 170 may include a fourth transistor T4. A control electrode of the fourth transistor T4 is coupled to a third control terminal RD, a first electrode of the fourth transistor T4 is coupled to the third node n3, and a second electrode of the fourth transistor T4 is coupled to an output terminal OUT.

Figure 3:
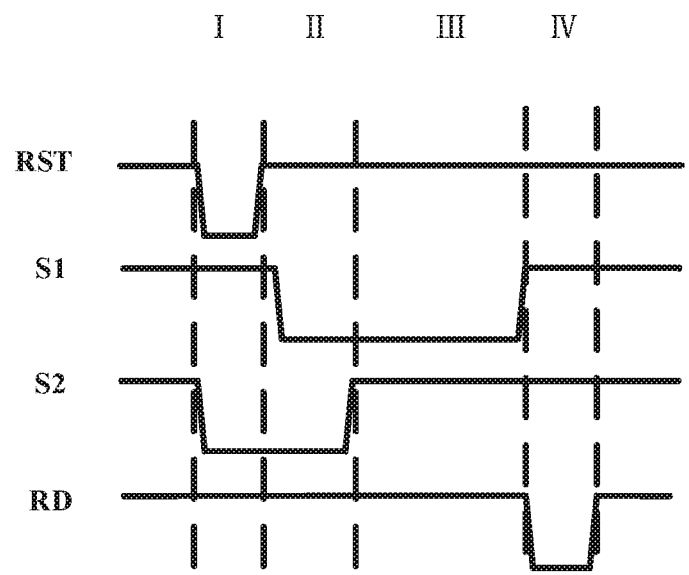
FIG. 3 is a timing diagram of each signal of the pixel circuit as shown in FIG. 2.

FIG. 3 illustrates a timing diagram of each signal of the pixel circuit 200 as shown in FIG. 2. A working process of the pixel circuit 200 as shown in FIG. 2 is described in detail below with reference to the timing diagram as shown in FIG. 3.

In the first phase I, the low level signal is inputted to the reset terminal RST, and thus the first transistor T1 is enabled. The low level signal is inputted to the second control terminal S2, and thus the third transistor T3 is enabled. Thus, both the voltage of the first node n1 and the voltage of the third node n3 are reset as the low level signal VSS of the first voltage terminal V1. Furthermore, the high level signal is inputted to the first control terminal S1, and thus the second transistor T2 is disabled. The high level signal is inputted to the third control terminal RD, and thus the fourth transistor T4 is disabled.

In this phase, the electric current converted by the photodiode PD does not affect the voltage of the first node n1.

In the second phase II, the high level signal is inputted to the reset terminal RST, and thus the first transistor T1 is disabled. The low level signal is inputted to the second control terminal S2 continuously, and thus the third transistor T3 is enabled continuously. Since the third transistor T3 is enabled, the first node n1 and the third transistor n3 are equivalent to one node. The low level signal is inputted to the first control terminal S1, and thus the second transistor T2 is enabled. Since the second transistor T2 is enabled, the voltage of the second node n2 is set to the high level signal VDD from the second voltage terminal V2. Thus, the amplifying transistor Ta is equivalent to an enabled transistor. The anode of the equivalent transistor is coupled to the second node n2, and the cathode of the equivalent transistor is coupled to the first node n1 and the third transistor n3. Therefore, the voltage of the first node n1 and the voltage of the third transistor n3 are equal to VDD−|Vth|. Here, Vth represents the threshold voltage of the equivalent transistor.

Moreover, the high level signal is inputted to the third control terminal RD continuously, and thus the fourth transistor T4 is kept disabled.

In the third phase III, the high level signal is inputted to the reset terminal RST continuously, and thus the first transistor T1 is kept disabled. The high level signal is inputted to the second control terminal S2, and thus the third transistor T3 is disabled. At this moment, only the electric current flowing through the photodiode PD affects the voltage of the first node n1. The magnitude of the electric current flowing through the photodiode PD is related to an intensity of light irradiated on the pixel. Supposing the electric current flowing through the photodiode PD is i, after a period of time t, the decreased amount of electric charges on the first node n1 is Q=it. The decreased voltage of the first node n1 is Q/Cpd=it/Cpd. Here, Cpd represents a parasitic capacitance of the photodiode PD. Therefore, the voltage of the first node n1 is Vn1=VDD−|Vth|−it/Cpd.

Furthermore, the low level signal is inputted to the first control terminal S1 continuously, and thus the second transistor T2 is kept enabled. Thus, the electric current flowing through the amplifying transistor Ta is in a saturation region, and the electric current is:

$$\begin{aligned} I &= uCoxW/L(V_{GS} - Vth)^2 \\ &= uCoxW/L(VDD - Vn1 - |Vth|)^2 \\ &= uCoxW/L(it/Cpd)^2 \end{aligned} \quad (1)$$

wherein u represents a carrier mobility, Cox represents a capacitance value of the gate insulation layer per unit area, and W/L represents a width-to-length ratio of the amplifying transistor Ta.

The electric charge variation $\Delta Q$ of the capacitor Cst caused by the electric current I is:

$$\Delta Q = \int I dt = \int uCoxW/L(it/Cpd)^2 dt \quad (2)$$

Moreover, the high level signal is inputted to the third control terminal RD continuously, and thus the fourth transistor T4 is kept disabled.

In the fourth phase IV, the high level signal is inputted to the reset terminal RST continuously, and thus the first transistor T1 is kept disabled. The high level signal is inputted to the second control terminal S2, and thus the third transistor T3 is disabled. The high level signal is inputted to the first control terminal S1, and thus the second transistor T2 is disabled. Thus, the amplifying transistor Ta stops amplifying the voltage of the first node n1. The low level signal is inputted to the third control terminal RD, and thus the fourth transistor T4 is enabled. In this way, the electric charge $\Delta Q$ stored on the capacitor Cst may be read out through the output terminal OUT. As can be seen from Formula (2), $\Delta Q$ is not related to the threshold voltage Vth of the amplifying transistor Ta. Therefore, information on irradiation intensity converted by the readout electric charge $\Delta Q$ is not affected by the threshold voltage Vth of the amplifying transistor Ta.

Figure 4:
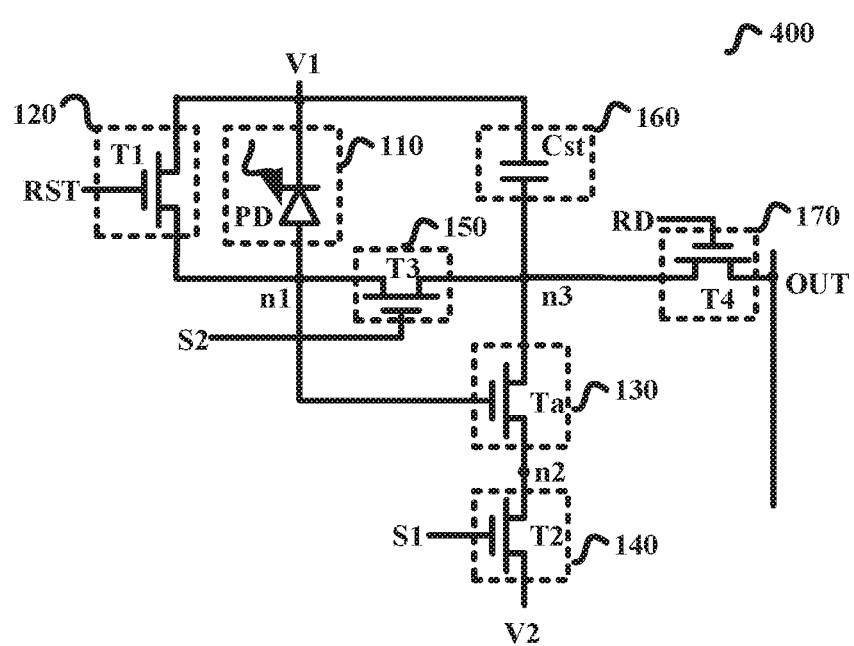
FIG. 4 is an exemplary circuit diagram of a pixel circuit according to an embodiment of the present disclosure.

FIG. 4 illustrates an exemplary circuit diagram of a pixel circuit 400 according to an embodiment of the present disclosure. In some embodiments as shown in FIG. 4, reference is made by taking an example in which all the transistors are N-type transistors. In this case, the high level signal VDD is outputted from the first voltage terminal V1, and the low level signal VSS is outputted from the second voltage terminal V2. The high level signal and the low level signal refer to a higher preset voltage signal and a lower preset voltage signal with respect to each other. Those skilled in the art may set the high level signal and the low level signal based on the selected device and the adopted circuit structure, but the present disclosure is not limited thereto.

As shown in FIG. 4, the storage circuit 160 may include a capacitor Cst. A first terminal of the capacitor Cst is coupled to the first voltage terminal V1, and a second terminal of the capacitor Cst is coupled to the third node n3.

The photoelectric conversion circuit 110 may include a photodiode PD. An anode of the photodiode PD is coupled to a first voltage terminal V1, and a cathode of the photodiode PD is coupled to a first node n1.

The reset circuit 120 may include a first transistor T1. A control electrode of the first transistor T1 is coupled to a reset terminal RST, a first electrode of the first transistor T1 is coupled to the first voltage terminal V1, and a second electrode of the first transistor T1 is coupled to the first node n1.

The amplifying transistor 130 may include an amplifying transistor Ta. A control electrode of the amplifying transistor Ta is coupled to the first node n1, a first electrode of the amplifying transistor Ta is coupled to the second node n2, and a second electrode of the amplifying transistor Ta is coupled to the third node n3.

The first control circuit 140 may include a second transistor T2. A control electrode of the second transistor T2 is coupled to a first control terminal S1, a first electrode of the second transistor T2 is coupled to a second voltage terminal V2, and a second electrode of the second transistor T2 is coupled to the second node n2.

The second control circuit 150 may include a third transistor T3. A control electrode of the third transistor T3 is coupled to a second control terminal S2, a first electrode of the third transistor T3 is coupled to the first node n1, and a second electrode of the third transistor T3 is coupled to the third node n3.

The output circuit 170 may include a fourth transistor T4. A control electrode of the fourth transistor T4 is coupled to a third control terminal RD, a first electrode of the fourth transistor T4 is coupled to the third node n3, and a second electrode of the fourth transistor T4 is coupled to an output terminal OUT.

Figure 5:
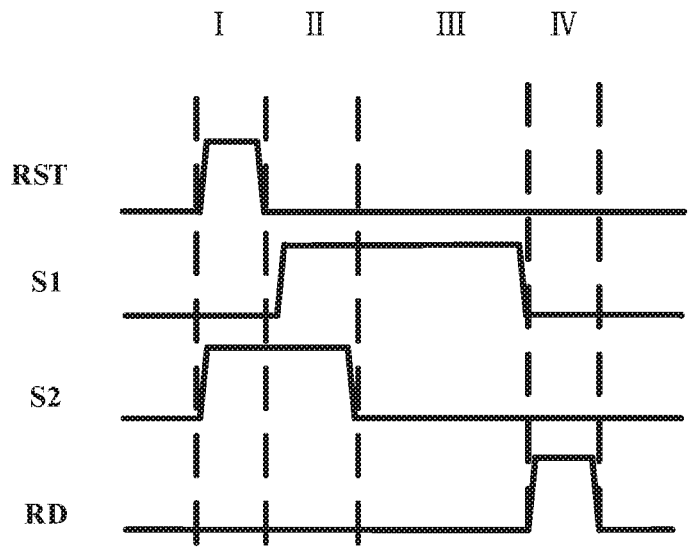
FIG. 5 is a timing diagram of each signal of the pixel circuit as shown in FIG. 4.

FIG. 5 illustrates a timing diagram of each signal of the pixel circuit 400 as shown in FIG. 4. A working process of the pixel circuit 400 as shown in FIG. 4 is described in detail below with reference to the timing diagram as shown in FIG. 5.

In the first phase I, the high level signal is inputted to the reset terminal RST, and thus the first transistor T1 is enabled. The high level signal is inputted to the second control terminal S2, and thus the third transistor T3 is enabled. Thus, both the voltage of the first node n1 and the voltage of the third node n3 are reset as the high level signal VDD of the first voltage terminal V1. Furthermore, the low level signal is inputted to the first control terminal S1, and thus the second transistor T2 is disabled. The low level signal is inputted to the third control terminal RD, and thus the fourth transistor T4 is disabled.

In this phase, the electric current converted by the photodiode PD does not affect the voltage of the first node n1.

In the second phase II, the low level signal is inputted to the reset terminal RST, and thus the first transistor T1 is disabled. The high level signal is inputted to the second control terminal S2 continuously, and thus the third transistor T3 is enabled continuously. Since the third transistor T3 is enabled, the first node n1 and the third transistor n3 are equivalent to one node. The high level signal is inputted to the first control terminal S1, and thus the second transistor T2 is enabled. Since the second transistor T2 is enabled, the voltage of the second node n2 is equivalent to the low level signal VSS from the second voltage terminal V2. Thus, the amplifying transistor Ta is equivalent to an enabled transistor. The anode of the equivalent transistor is coupled to the second node n2, and the cathode of the equivalent transistor is coupled to the first node n1 and the third transistor n3. Therefore, the voltage of the first node n1 and the voltage of the third transistor n3 are equal to VSS+Vth. Here, Vth represents the threshold voltage of the equivalent transistor. Moreover, the low level signal is inputted to the third control terminal RD continuously, and thus the fourth transistor T4 is kept disabled.

In the third phase III, the low level signal is inputted to the reset terminal RST continuously, and thus the first transistor T1 is kept disabled. The low level signal is inputted to the second control terminal S2, and thus the third transistor T3 is disabled. At this moment, only the electric current flowing through the photodiode PD affects the voltage of the first node n1. The magnitude of the electric current flowing through the photodiode PD is related to an intensity of light irradiated on the pixel. Supposing the electric current flowing through the photodiode PD is i, after a period of time t, the increased amount of electric charges on the first node n1 is Q=it. The increased voltage of the first node n1 is Q/Cpd=it/Cpd. Here, Cpd represents a parasitic capacitance of the photodiode PD. Therefore, the voltage of the first node n1 is Vn1=VSS+Vth+it/Cpd.

Furthermore, the high level signal is inputted to the first control terminal S1 continuously, and thus the second transistor T2 is kept enabled. Thus, the electric current flowing through the amplifying transistor Ta is in a saturation region, and the electric current is:

$$I = uCoxW/L(V_{GS} - Vth)^2 \quad (3)$$
$$= uCoxW/L(Vn1 - VSS - Vth)^2$$
$$= uCoxW/L(it/Cpd)^2$$

wherein u represents a carrier mobility, Cox represents a capacitance value of the gate insulation layer per unit area, and W/L represents a width-to-length ratio of the amplifying transistor Ta.

The electric charge variation ΔQ of the capacitor Cst caused by the electric current I is:

$$\Delta Q = \int I dt = \int uCoxW/L(it/Cpd)^2 dt \quad (4)$$

Moreover, the low level signal is inputted to the third control terminal RD continuously, and thus the fourth transistor T4 is kept disabled.

In the fourth phase IV, the low level signal is inputted to the reset terminal RST continuously, and thus the first transistor T1 is kept disabled. The low level signal is inputted to the second control terminal S2, and thus the third transistor T3 is disabled. The low level signal is inputted to the first control terminal S1, and thus the second transistor T2 is disabled. Thus, the amplifying transistor Ta stops amplifying the voltage of the first node n1. The high level signal is inputted to the third control terminal RD, and thus the fourth transistor T4 is enabled. In this way, the electric charge ΔQ stored on the capacitor Cst may be read out through the output terminal OUT. As can be seen from Formula (4), ΔQ is not related to the threshold voltage Vth of the amplifying transistor Ta. Therefore, information on irradiation intensity converted by way of the readout electric charge ΔQ is not affected by the threshold voltage Vth of the amplifying transistor Ta.

FIG. 2 illustrates an embodiment in which all the transistors of the pixel circuit are P-type transistors, and FIG. 4 illustrates an embodiment in which all the transistors of the pixel circuit are N-type transistors. However, those skilled in the art may know that the pixel circuit 100 also may be implemented by combination of the N-type transistors and the P-type transistors. Correspondingly, the timing sequence of each signal in the pixel circuit 100 is changed adaptively.

Figure 6:
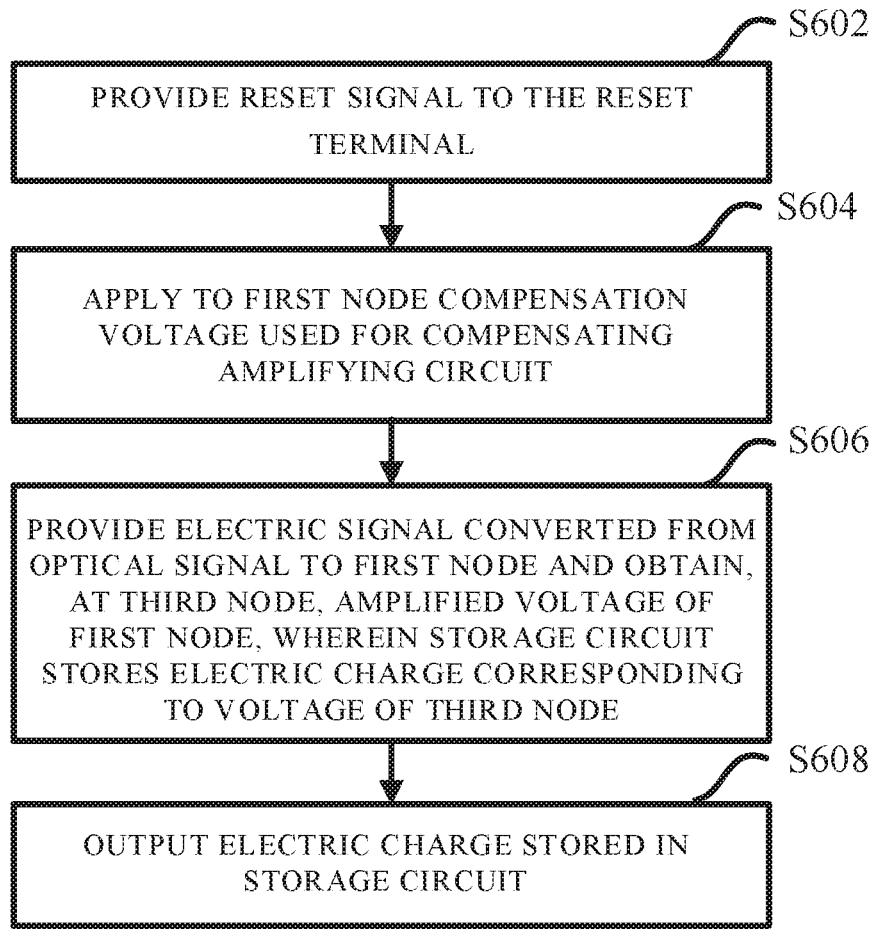
FIG. 6 is a schematic flowchart of a drive method for driving the pixel circuit as shown in FIG. 1, FIG. 2, or FIG. 4 according to an embodiment of the present disclosure.

FIG. 6 illustrates a schematic flowchart of a drive method 600 for driving the pixel circuit as shown in FIG. 1, or FIG. 2, or FIG. 4 according to an embodiment of the present disclosure.

In this drive method, in step S602, a reset signal is provided to the reset terminal RST so as to reset a voltage of the first node n1.

In step S604, a first voltage signal is provided to the first control terminal S1 and the second control terminal S2 so as to apply to the first node n1 a compensation voltage used for compensating the amplifying circuit 130. A second voltage signal is provided to the third control terminal RD. At this phase, the output terminal OUT has no output.

In step S606, the first voltage signal is provided to the first control terminal S1 continuously and the second voltage signal is provided to the second control terminal S2, so as to provide an electric signal converted from an optical signal to the first node n1 and to obtain, at the third node n3, the amplified voltage of the first node n1. The storage circuit 160 stores an electric charge corresponding to the voltage (i.e., the voltage of the third node n3) outputted from the amplifying circuit 130. A second voltage signal is provided to the third control terminal RD. At this phase, the output terminal OUT has no output.

In step S608, the second voltage signal is provided to the first control terminal S1, and the first voltage signal is provided to the third control terminal RD. At this phase, the electric charge stored in the storage circuit 160 is outputted from the output terminal OUT. Thus, the external circuit may convert the electric charge outputted from the output terminal OUT into a digitized signal representing the irradiation intensity.

The second voltage signal is the high level signal in the case that the first voltage signal is the low level signal. The second voltage signal is the low level signal in the case that the first voltage signal is the high level signal.

Figure 7:
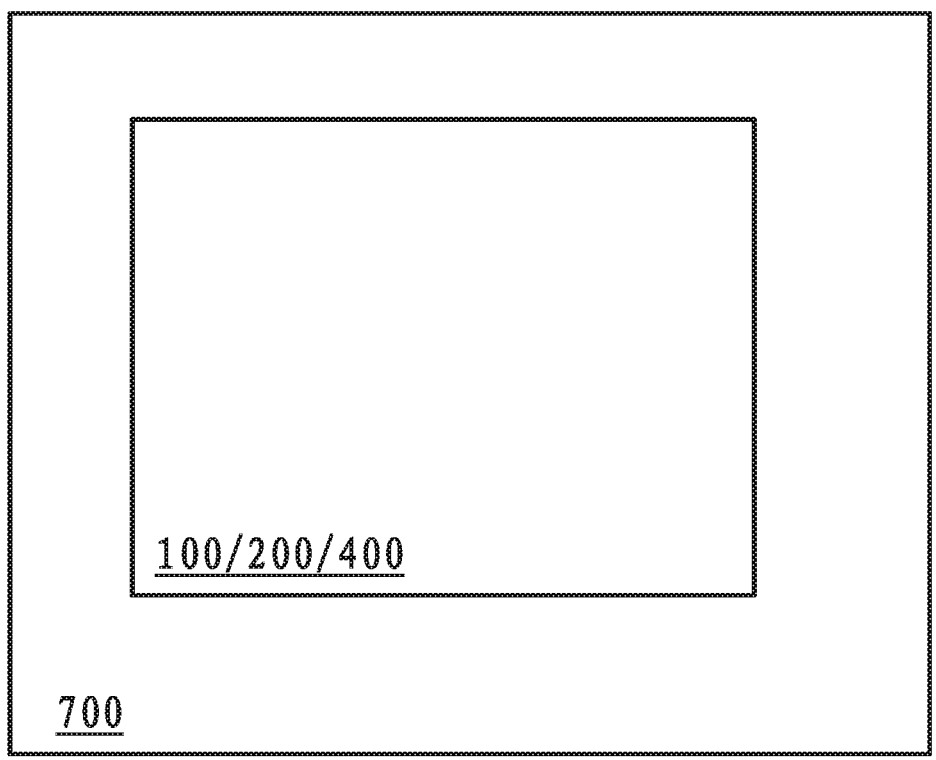
FIG. 7 is a schematic block diagram of a detector according to an embodiment of the present disclosure.

FIG. 7 illustrates a schematic block diagram of a detector 700 according to an embodiment of the present disclosure. As shown in FIG. 7, the detector 700 includes the pixel circuit 100 as shown in FIG. 1, or the pixel circuit 200 as shown in FIG. 2, or the pixel circuit 400 as shown in FIG. 4.

As used herein and in the appended claims, the singular form of a word includes the plural, and vice versa, unless the context clearly dictates otherwise. Thus, singular words are generally inclusive of the plurals of the respective terms. Similarly, the words "include" and "comprise" are to be interpreted as inclusively rather than exclusively. Likewise, the terms "include" and "or" should be construed to be inclusive, unless such an interpretation is clearly prohibited from the context. Where used herein the term "examples," particularly when followed by a listing of terms is merely exemplary and illustrative, and should not be deemed to be exclusive or comprehensive.

Further adaptive aspects and scopes become apparent from the description provided herein. It should be understood that various aspects of the present disclosure may be implemented separately or in combination with one or more other aspects. It should also be understood that the description and specific embodiments in the present disclosure are intended to describe rather than limit the scope of the present disclosure.

A plurality of embodiments of the present disclosure has been described in detail above. However, apparently those skilled in the art may make various modifications and variations on the embodiments of the present disclosure without departing from the spirit and scope of the present disclosure. The scope of protecting of the present disclosure is limited by the appended claims.

What is claimed is:

1. A pixel circuit comprising:
    a photoelectric conversion circuit coupled to a first node and a first voltage terminal and configured to convert an optical signal into an electric signal;
    a reset circuit coupled to a reset terminal, the first node, and the first voltage terminal and configured to reset a voltage of the first node based on a reset signal from the reset terminal and a first voltage signal from the first voltage terminal;
    an amplifying circuit coupled to the first node, a second node, and a third node and configured to amplify the voltage of the first node;
    a first control circuit coupled to a first control terminal, a second voltage terminal, and the second node and configured to control a voltage of the second node based on a first control signal from the first control terminal and a second voltage signal from the second voltage terminal;
    a second control circuit coupled to the first node, the third node, and a second control terminal and configured to control a voltage of the third node based on a second control signal from the second control terminal and the voltage of the first node;
    a storage circuit coupled to the first voltage terminal and the third node and configured to store an electric charge corresponding to the voltage outputted from the amplifying circuit; and
    an output circuit coupled to the third node, a third control terminal, and an output terminal and configured to output the electric charge stored in the storage circuit under the control of a third control signal of the third control terminal, wherein the storage circuit comprises a capacitor, wherein a first terminal of the capacitor is directly coupled to the first voltage terminal, wherein a second terminal of the capacitor is coupled to the third node, wherein the photoelectric conversion circuit comprises a photodiode, wherein an anode of the photodiode is directly coupled to the first voltage terminal, and wherein a cathode of the photodiode is coupled to the first node.

2. The pixel circuit according to claim 1, wherein the reset circuit comprises a first transistor, wherein a control electrode of the first transistor is coupled to the reset terminal, wherein a first electrode of the first transistor is coupled to the first voltage terminal, and wherein a second electrode of the first transistor is coupled to the first node.

3. The pixel circuit according to claim 1, wherein the amplifying circuit comprises an amplifying transistor, wherein a control electrode of the amplifying transistor is coupled to the first node, wherein a first electrode of the amplifying transistor is coupled to the second node, and wherein a second electrode of the amplifying transistor is coupled to the third node.

4. The pixel circuit according to claim 1, wherein the first control circuit comprises a second transistor, wherein a control electrode of the second transistor is coupled to the first control terminal, wherein a first electrode of the second transistor is coupled to the second voltage terminal, and wherein a second electrode of the second transistor is coupled to the second node.

5. The pixel circuit according to claim 1, wherein the second control circuit comprises a third transistor, wherein a control electrode of the third transistor is coupled to the second control terminal, wherein a first electrode of the third transistor is coupled to the first node, and wherein a second electrode of the third transistor is coupled to the third node.

6. The pixel circuit according to claim 1, wherein the output circuit comprises a fourth transistor, wherein a control electrode of the fourth transistor is coupled to the third control terminal, wherein a first electrode of the fourth transistor is coupled to the third node, and wherein a second electrode of the fourth transistor is coupled to the output terminal.

7. A detector comprising the pixel circuit according to claim 1.

8. A drive method for driving the pixel circuit according to claim 1, the drive method comprising:
    providing the reset signal to the reset terminal, so as to reset the voltage of the first node;
    providing the first control signal to the first control terminal and providing the second control signal to the second control terminal, so as to apply to the first node a compensation voltage used for compensating the amplifying circuit;
    providing the first control signal to the first control terminal and providing the second control signal to the second control terminal, so as to provide the electric signal converted from the optical signal to the first node and to obtain, at the third node, the amplified voltage of the first node, the storage circuit storing the electric charge corresponding to the voltage of the third node; and
    providing the third control signal to the third control terminal, so as to output the electric charge stored in the storage circuit.

9. A pixel circuit comprising a photodiode, a first transistor, an amplifying transistor, a second transistor, a third transistor, a capacitor, and a fourth transistor,
    wherein an anode of the photodiode is directly coupled to a first voltage terminal, and a cathode of the photodiode is coupled to a first node;
    wherein a control electrode of the first transistor is coupled to a reset terminal, a first electrode of the first transistor is coupled to the first voltage terminal, and a second electrode of the first transistor is coupled to the first node;
    wherein a control electrode of the amplifying transistor is coupled to the first node, a first electrode of the amplifying transistor is coupled to a second node, and a second electrode of the amplifying transistor is coupled to a third node;
    wherein a control electrode of the second transistor is coupled to a first control terminal, a first electrode of the second transistor is coupled to a second voltage terminal, and a second electrode of the second transistor is coupled to the second node;

wherein a control electrode of the third transistor is coupled to a second control terminal, a first electrode of the third transistor is coupled to the first node, and a second electrode of the third transistor is coupled to the third node;

wherein a first terminal of the capacitor is directly coupled to the first voltage terminal, a second terminal of the capacitor is coupled to the third node, and the capacitor is configured to store an electric charge corresponding to the voltage outputted from the amplifying transistor; and wherein a control electrode of the fourth transistor is coupled to a third control terminal, a first electrode of the fourth transistor is coupled to the third node, a second electrode of the fourth transistor is coupled to an output terminal, and the fourth transistor is configured to output the electric charge stored in the capacitor under the control of a third control signal of the third control terminal.

10. The pixel circuit according to claim 9, wherein the transistors are either P-type transistors or N-type transistors.

11. A drive method for driving the pixel circuit according to claim 9, the drive method comprising:

providing a reset signal to the reset terminal, so as to reset a voltage of the first node;

providing a first control signal to the first control terminal and providing a second control signal to the second control terminal, so as to apply to the first node a compensation voltage used for compensating the amplifying transistor;

providing the first control signal to the first control terminal and providing the second control signal to the second control terminal, so as to provide an electric signal converted from an optical signal to the first node and to obtain, at the third node, the amplified voltage of the first node, the capacitor storing the electric charge corresponding to the voltage of the third node; and providing a third control signal to the third control terminal, so as to output the electric charge stored in the capacitor.

* * * * *